United States Patent
Cerny

(10) Patent No.: US 10,438,319 B2
(45) Date of Patent: *Oct. 8, 2019

(54) VARYING EFFECTIVE RESOLUTION BY SCREEN LOCATION IN GRAPHICS PROCESSING BY APPROXIMATING PROJECTION OF VERTICES ONTO CURVED VIEWPORT

(71) Applicant: SONY INTERACTIVE ENTERTAINMENT LLC, San Mateo, CA (US)

(72) Inventor: Mark Evan Cerny, Los Angeles, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/829,579

(22) Filed: Dec. 1, 2017

(65) Prior Publication Data

US 2018/0089798 A1   Mar. 29, 2018

Related U.S. Application Data

(63) Continuation of application No. 14/246,066, filed on Apr. 5, 2014, now Pat. No. 9,836,816.

(51) Int. Cl.
*G02B 27/01*  (2006.01)
*G06T 15/00*  (2011.01)
(Continued)

(52) U.S. Cl.
CPC ............. *G06T 3/40* (2013.01); *G02B 27/017* (2013.01); *G02B 27/0172* (2013.01); *G06T 1/60* (2013.01);
(Continued)

(58) Field of Classification Search
CPC ..... G02B 27/017; G06T 15/005; G06T 15/10; G06T 15/80; G06T 17/10; G06T 17/20; G06T 1/60; G06T 2210/36; G06T 3/40
See application file for complete search history.

(56) References Cited

U.S. PATENT DOCUMENTS 4,513,317 A   4/1985   Ruoff
5,130,794 A   7/1992   Ritchey
(Continued)

FOREIGN PATENT DOCUMENTS

JP   2000155850 A   6/2000
JP   2002503854 A   2/2002
(Continued)

OTHER PUBLICATIONS

About Early-Z Culling (Advance Z Pick), Author: cywater2000, Date: Dec. 7, 2008, From: https://blog.csdn.net/cywater2000/article/details/3465300.
(Continued)

*Primary Examiner* — Sing-Wai Wu
(74) *Attorney, Agent, or Firm* — JDI Patent; Joshua Isenberg; Robert Pullman

(57) ABSTRACT

In graphics processing data is received representing one or more vertices for a scene in a virtual space. A projection of the vertices onto a screen space of a display device is performed. The projection approximates a projection of the vertices onto a curved viewport. Primitive assembly is performed on the vertices to generate a one or more primitives in screen space from the projection of the vertices onto the screen space. Scan conversion is performed on the one or more primitives to determine which pixel or pixels of the plurality of pixels are part of corresponding primitives of the one or more primitives. A finished frame is then generated by performing pixel processing to assign pixel values to the pixel or pixels that are part of the corresponding primitives.
(Continued)

In some implementations, the finished frame can be stored in the memory or displayed on the display device.

33 Claims, 8 Drawing Sheets

(51) Int. Cl.
  G06T 15/80 (2011.01)
  G06T 17/10 (2006.01)
  G06T 17/20 (2006.01)
  G06T 1/60 (2006.01)
  G06T 3/40 (2006.01)
  G06T 15/10 (2011.01)

(52) U.S. Cl.
  CPC ............ *G06T 15/005* (2013.01); *G06T 15/10* (2013.01); *G06T 15/80* (2013.01); *G06T 17/10* (2013.01); *G06T 17/20* (2013.01); *G02B 2027/0123* (2013.01); *G06T 2210/36* (2013.01)

(56) References Cited

U.S. PATENT DOCUMENTS

| | | | |
|---|---|---|---|
| 5,224,208 A | 6/1993 | Miller et al. | |
| 5,422,653 A | 6/1995 | Maguire | |
| 5,602,391 A | 2/1997 | Pines et al. | |
| 5,777,913 A | 7/1998 | Rasmusson | |
| H1812 H | 11/1999 | Arcuri | |
| 6,313,838 B1 | 11/2001 | Deering | |
| 6,417,861 B1 | 7/2002 | Deering et al. | |
| 6,424,343 B1 | 7/2002 | Deering et al. | |
| 6,469,700 B1 | 10/2002 | Munshi et al. | |
| 6,476,819 B1 | 11/2002 | Ozawa | |
| 6,496,187 B1 | 12/2002 | Deering et al. | |
| 6,731,298 B1 | 5/2004 | Moreton et al. | |
| 6,804,066 B1 | 10/2004 | Ha et al. | |
| 6,906,723 B2 | 6/2005 | Ault | |
| 6,967,663 B1 | 11/2005 | Bastos et al. | |
| 7,046,245 B2 | 5/2006 | Cerny et al. | |
| 7,081,893 B2 | 7/2006 | Cerny | |
| 7,161,603 B2 | 1/2007 | Saito et al. | |
| 7,336,277 B1 | 2/2008 | Clark et al. | |
| 7,339,594 B1 | 3/2008 | Newhall et al. | |
| 7,355,604 B2 | 4/2008 | Bando et al. | |
| 7,426,724 B2 | 9/2008 | Kilgard et al. | |
| 7,511,717 B1 | 3/2009 | Bastos et al. | |
| 7,786,993 B2 | 8/2010 | Cerny et al. | |
| 7,876,332 B1 | 1/2011 | Donham et al. | |
| 7,907,792 B2 | 3/2011 | Harville | |
| 7,916,155 B1 | 3/2011 | Moreton | |
| 8,031,192 B2 | 10/2011 | Cerny | |
| 8,044,956 B1 | 10/2011 | Kilgard | |
| 8,090,383 B1 | 1/2012 | Emigh et al. | |
| 8,144,156 B1 | 3/2012 | Baldwin | |
| 8,149,242 B2 | 4/2012 | Langyel et al. | |
| 8,174,527 B2 | 5/2012 | Cerny et al. | |
| 8,207,975 B1 | 6/2012 | Molnar et al. | |
| 8,228,328 B1 | 7/2012 | French et al. | |
| 8,233,004 B1 | 7/2012 | Molnar et al. | |
| 8,300,059 B2 | 10/2012 | Isidoro et al. | |
| 8,581,929 B1 | 11/2013 | Maguire | |
| 8,643,644 B2 | 2/2014 | Wei et al. | |
| 8,669,999 B2 | 3/2014 | Donovan et al. | |
| 9,316,834 B2 | 4/2016 | Makino et al. | |
| 9,495,790 B2 | 11/2016 | Cerny | |
| 2002/0057279 A1 | 5/2002 | Jouppi | |
| 2003/0086603 A1 | 5/2003 | Davidson et al. | |
| 2003/0112238 A1 | 6/2003 | Cerny et al. | |
| 2003/0112240 A1 | 6/2003 | Cerny | |
| 2003/0122833 A1 | 7/2003 | Doyle | |
| 2003/0234784 A1 | 12/2003 | Grzeszczuk et al. | |
| 2004/0036692 A1 | 2/2004 | Alcorn et al. | |
| 2004/0169663 A1 | 9/2004 | Bernier | |
| 2004/0212619 A1 | 10/2004 | Saito et al. | |
| 2004/0227703 A1 | 11/2004 | Lamvik et al. | |
| 2005/0017983 A1 | 1/2005 | Liao et al. | |
| 2005/0190183 A1* | 9/2005 | Barone | G06T 15/005 |
| | | | 345/427 |
| 2005/0225670 A1 | 10/2005 | Wexler et al. | |
| 2006/0001674 A1 | 1/2006 | Cerny et al. | |
| 2006/0077209 A1 | 4/2006 | Bastos et al. | |
| 2006/0256112 A1 | 11/2006 | Heirich et al. | |
| 2006/0277520 A1 | 12/2006 | Gennari | |
| 2007/0002049 A1 | 1/2007 | Cerny | |
| 2007/0018988 A1 | 1/2007 | Guthe | |
| 2007/0165035 A1 | 7/2007 | Duluk et al. | |
| 2007/0183649 A1 | 8/2007 | Kiefer et al. | |
| 2008/0062164 A1 | 3/2008 | Bassi et al. | |
| 2008/0106489 A1 | 5/2008 | Brown et al. | |
| 2008/0113792 A1 | 5/2008 | Yamada et al. | |
| 2008/0129748 A1 | 6/2008 | Bakalash et al. | |
| 2009/0002380 A1 | 1/2009 | Langyel et al. | |
| 2009/0033659 A1 | 2/2009 | Lake et al. | |
| 2009/0141033 A1 | 6/2009 | Street | |
| 2010/0002000 A1 | 1/2010 | Everitt et al. | |
| 2010/0007662 A1 | 1/2010 | Cox et al. | |
| 2010/0104162 A1 | 4/2010 | Falk et al. | |
| 2010/0110102 A1 | 5/2010 | Nystad et al. | |
| 2010/0156919 A1 | 6/2010 | Bala et al. | |
| 2010/0214294 A1 | 8/2010 | Li et al. | |
| 2010/0283783 A1 | 11/2010 | Cerny et al. | |
| 2011/0090242 A1 | 4/2011 | Frederiksen | |
| 2011/0090250 A1 | 4/2011 | Molnar et al. | |
| 2011/0134136 A1 | 6/2011 | Seiler | |
| 2011/0188744 A1 | 8/2011 | Sun | |
| 2011/0216069 A1 | 9/2011 | Keall et al. | |
| 2012/0014576 A1 | 1/2012 | Olson et al. | |
| 2012/0069021 A1 | 3/2012 | Son et al. | |
| 2012/0092366 A1 | 4/2012 | Smithers et al. | |
| 2012/0206452 A1 | 8/2012 | Geisner et al. | |
| 2012/0293486 A1 | 11/2012 | Adachi | |
| 2012/0293519 A1 | 11/2012 | Ribble et al. | |
| 2013/0021358 A1 | 1/2013 | Nordlund et al. | |
| 2013/0063440 A1 | 3/2013 | Son et al. | |
| 2013/0093766 A1 | 4/2013 | Hutchins et al. | |
| 2013/0114680 A1 | 5/2013 | Leontaris et al. | |
| 2013/0120380 A1 | 5/2013 | Kallio et al. | |
| 2013/0141445 A1 | 6/2013 | Engh-Halstvedt et al. | |
| 2013/0265309 A1 | 10/2013 | Goel et al. | |
| 2013/0300740 A1 | 11/2013 | Snyder et al. | |
| 2013/0342547 A1 | 12/2013 | Lum et al. | |
| 2014/0049549 A1 | 2/2014 | Lukyanov et al. | |
| 2014/0063016 A1 | 3/2014 | Howson et al. | |
| 2014/0362081 A1 | 12/2014 | Cerny et al. | |
| 2014/0362100 A1 | 12/2014 | Cerny et al. | |
| 2014/0362101 A1 | 12/2014 | Cerny et al. | |
| 2014/0362102 A1 | 12/2014 | Cerny et al. | |
| 2015/0089367 A1 | 3/2015 | Dodge et al. | |
| 2015/0287158 A1 | 10/2015 | Cerny et al. | |
| 2015/0287166 A1 | 10/2015 | Cerny | |
| 2015/0287167 A1 | 10/2015 | Cerny | |
| 2015/0287230 A1 | 10/2015 | Cerny | |
| 2015/0287232 A1 | 10/2015 | Cerny | |
| 2016/0246323 A1 | 8/2016 | Cerny et al. | |
| 2017/0031732 A1 | 2/2017 | Cerny et al. | |
| 2017/0031834 A1 | 2/2017 | Cerny et al. | |
| 2017/0061671 A1 | 3/2017 | Cerny | |
| 2017/0123961 A1 | 5/2017 | Cerny et al. | |

FOREIGN PATENT DOCUMENTS

| | | |
|---|---|---|
| JP | 2002503855 A | 7/2002 |
| JP | 2002260003 A | 9/2002 |
| JP | 2002537614 A | 11/2002 |
| JP | 2004265413 A | 9/2004 |
| JP | 2006293627 A | 10/2006 |
| JP | 2008233765 A | 10/2008 |
| JP | 2009116550 A | 5/2009 |
| JP | 2013137756 A | 7/2013 |
| KR | 20130029149 A | 3/2013 |
| TW | I250785 B | 3/2006 |
| TW | 200919376 A | 5/2009 |
| TW | 201001329 A | 1/2010 |

(56) References Cited

FOREIGN PATENT DOCUMENTS

| TW | 201143466 A | 12/2011 |
|---|---|---|
| WO | 2010111258 A1 | 9/2010 |
| WO | 2013076994 A1 | 5/2013 |
| WO | 2013076994 A9 | 4/2014 |

OTHER PUBLICATIONS

Co-Pending U.S. Appl. No. 14/246,061, to Tobias Berghoff, filed Apr. 5, 2014.
Co-Pending U.S. Appl. No. 14/246,062, to Mark Evan Cerny, filed Apr. 5, 2014.
Co-Pending U.S. Appl. No. 14/246,063, to Mark Evan Cerny, filed Apr. 5, 2014.
Co-Pending U.S. Appl. No. 14/246,064, to Tobias Berghoff, filed Apr. 5, 2014.
Co-Pending U.S. Appl. No. 14/246,066, to Mark Evan Cerny, filed Apr. 5, 2014.
Co-Pending U.S. Appl. No. 14/246,067, to Tobias Berghoff, filed Apr. 5, 2014.
Co-Pending U.S. Appl. No. 14/246,068, to Mark Evan Cerny, filed Apr. 5, 2014.
Extended European search report dated Aug. 29, 2017 for European Patent Application No. 15773477.3.
Extended European search report dated Sep. 22, 2017 for European Patent Application No. 15772568.0.
Extended European Search Report dated Aug. 29, 2017 for EP Application No. 15773477.3.
Extended European Search Report dated Oct. 2, 2017 for European patent application EP15773048.
Extended European Search Report dated Sep. 22, 2017 for EP Application No. 15772990.
Final Office Action for U.S. Appl. No. 14/246,061, dated Feb. 20, 2018.
Final Office Action for U.S. Appl. No. 14/246,061, dated Apr. 7, 2017.
Final Office Action for U.S. Appl. No. 14/246,061, dated Jun. 17, 2016.
Final Office Action for U.S. Appl. No. 14/246,062, dated Jul. 15, 2016.
Final Office Action for U.S. Appl. No. 14/246,063, dated Jun. 21, 2016.
Final Office Action for U.S. Appl. No. 14/246,064, dated Jul. 11, 2016.
Final Office Action for U.S. Appl. No. 14/246,064, dated May 5, 2017.
Final Office Action for U.S. Appl. No. 14/246,066, dated Apr. 7, 2017.
Final Office Action for U.S. Appl. No. 14/246,066, dated Jul. 20, 2016.
Final Office Action for U.S. Appl. No. 14/246,067, dated Jun. 17, 2016.
International Search Report and Written Opinion for International Application No. PCT/US2015/024303, dated Jul. 1, 2015.
International Search Report and Written Opinion for International Application No. PCT/US2015/21951, dated Jul. 1, 2015
International Search Report and Written Opinion for International Application No. PCT/US2015/21956, dated Jul. 1, 2015.
International Search Report and Written Opinion for International Application No. PCT/US2015/21971, dated Jul. 1, 2015.
International Search Report and Written Opinion for International Application No. PCT/US2015/21978, dated Jul. 1, 2015.
International Search Report and Written Opinion for International Application No. PCT/US2015/21984, dated Jul. 1, 2015.
International Search Report and Written Opinion for International Application No. PCT/US2015/21987, dated Jul. 1, 2015.
International Search Report and Written Opinion for International Application No. PCT/US2015021982, dated Nov. 30, 2017.
International Search Report and Written Opinion for International Application No. PCT/US201521982, dated Jul. 1, 2015.
Jacob Munkberg et al: "Hierarchical stochastic motion blur rasterization",High Performance Graphics, Association for Computing Machinery, Inc., Aug. 5, 2011 (Aug. 5, 2011), pp. 107-118.
John D. Owens, Mike Houston, David Luebke, Simon Green, John E. Stone, and James C. Phillips, "GPU Computing", Proceeding of IEEE, May 2008, p. 879-899.
Kayvon Fatahalian et al: "Reducing shading on GPUs using quad-fragment merging", ACM Transactions on Graphics US, vol. 29 , No. 4, Jul. 26, 2010 pp. 1-8 , XP058157954, ISSN: 0730-0301.
Marries Van De Hoef et al: "Comparison of mutiple rendering techniques", Jun. 4, 2010 (Jun. 9, 2010).
Matthaus G. Chajdas, Morgan McGuire, David Luebke; "Subpixel Reconstruction Antialiasing for Deferred Shading" in i3D, Feb. 2011.
Non-final Office Action dated Aug. 24, 2017 for U.S. Appl. No. 14/246,061.
Non-Final Office Action for U.S. Appl. No. 15/587,825, dated Jun. 30, 2017.
Non-Final Office Action for U.S. Appl. No. 15/717,041, dated Dec. 14, 2017.
Non-Final Office Action for U.S. Appl. No. 14/246,061, dated Jan. 4, 2016.
Non-Final Office Action for U.S. Appl. No. 14/246,062, dated Jan. 14, 2016.
Non-Final Office Action for U.S. Appl. No. 14/246,063, dated Jan. 4, 2016.
Non-Final Office Action for U.S. Appl. No. 14/246,063, dated Nov. 23, 2016.
Non-Final Office Action for U.S. Appl. No. 14/246,064, dated Dec. 8, 2016.
Non-Final Office Action for U.S. Appl. No. 14/246,064, dated Feb. 1, 2015.
Non-Final Office Action for U.S. Appl. No. 14/246,066, dated Dec. 30, 2016.
Non-Final Office Action for U.S. Appl. No. 14/246,066, dated Feb. 5, 2016.
Non-Final Office Action for U.S. Appl. No. 14/246,067, dated Jan. 22, 2016.
Non-Final Office Action for U.S. Appl. No. 14/246,067, dated Oct. 27, 2016.
Extended European Search Report dated Sep. 22, 2017 for European patent application EP15772990.6.
Final Office Action for U.S. Appl. No. 15/587,285, dated Feb. 6, 2018.
Final Office Action for U.S. Appl. No. 15/717,041, dated Apr. 18, 2018.
Notice of Allowance for U.S. Appl. No. 15/587,825, dated May 31, 2018.
Office Action dated Apr. 26, 2018 for Korean Patent Application No. 10-2016-7027105.
Office Action dated Apr. 26, 2018 for Korean Patent Application No. 10-2016-7027106.
Office Action dated May 28, 2018 for Korean Patent Application No. 2016-7027633.
Non-Final Office Action for U.S. Appl. No. 14/246,068, dated Jan. 14, 2016.
Non-Final Office Action for U.S. Appl. No. 14/678,445, dated Dec. 30, 2016.
Non-Final Office Action for U.S. Appl. No. 141246,061, dated Oct. 20, 2016.
Non-Final Office Action for U.S. Appl. No. 15/351,310, dated Feb. 6, 2017.
Non-Final/Final Office Action for U.S. Appl. No. 14/246,061, dated Aug. 24, 2017.
Notice of Allowance dated Aug. 4, 2017 for U.S. Appl. No. 14/246,066.
Notice of Allowance for U.S. Appl. No. 14/246,066, dated Aug. 4, 2017.
Notice of Allowance for U.S. Appl. No. 15/351,310, dated Jun. 5, 2017.

(56) References Cited

OTHER PUBLICATIONS

Notice of Allowance for U.S. Appl. No. 14/246,062, dated Jan. 4, 2017.
Notice of Allowance for U.S. Appl. No. 14/246,063, dated Mar. 14, 2017.
Notice of Allowance for U.S. Appl. No. 14/246,067, dated Mar. 16, 2017.
Notice of Allowance for U.S. Appl. No. 14/246,068, dated Jul. 15, 2016.
Notification of Reason(s) for Refusal dated Feb. 6, 2018 for Japanese Patent application No. 2016-560652.
Notification of Reason(s) for Refusal dated Sep. 12, 2017 for Japanese Patent application No. 2016-559961.
Notification of Reasons for Refusal dated Feb. 6, 2018 for Japanese Patent application No. 2016-560826.
Office Action dated Aug. 1, 2017 for Korean Patent Application No. 0-2016-7027635.
Office Action dated Aug. 29, 2017 for TW Application No. 105138883.
Office Action dated Jan. 9, 2018 for Taiwan Patent Application No. 104108773.
Office Action dated Oct. 3, 2017 for JP Application No. 2016-560398.
Office Action dated Oct. 31, 2017 for Japan Patent Application 2016-560646.
Office Action dated Oct. 31, 2017 for Japan Patent Application No. 2016-560646.
Office Action dated Sep. 5, 2017 for Japanese Patent Application No. 2016-560642.
Scott Kircher et al: "Inferred lighting: fast dynamic lighting and shadows for opaque and translucent objects", Sandbox 2009 : Proceedings ; 4th ACM SIGGRAPH Symposium on Video Games ; New Orleans , Louisiana , Aug. 4-6, 2009 , ACM, New York, NYRetrieved from the Internet: URL:http://dl.acm.org/ft_gateway.cfm?id=1581080&ftid=658593&dwn=I&CFID=587315678&CFTOKEN=20408680.
Shirman et al, "A new look at mipmap level estimation techniques", Computers and Graphics , Elsevier, GB , vol. 23 , No. 2, Apr. 1, 1999 (Apr. 1999) , pp. 223-231 , XP004165786 , ISSN: 0097-8493.
Steve Marschner et al: "Geometry-Aware Framebuffer, Level of Detail", Eurographics Symposium on Rendering 2008, Jan. 1, 2008 (Jan. 1, 2008) , XP055239091, Retrieved from the Internet: URL:https://www.cs.virginia.edu/~jdl/papers/resize/yang_egsr08.pdf.
Taiwan Office Action for TW Application No. 104108777, dated Jun. 27, 2016.
Taiwanese Office Action for TW Application No. 104108773, dated Dec. 22, 2015.
Taiwanese Office Action for TW Application No. 104108774, dated Sep. 12, 2016.
U.S. Appl. No. 14/246,061, to Tobias Berghoff, filed Apr. 5, 2014.
U.S. Appl. No. 14/246,062, to Mark Evan Cerny, filed Apr. 5, 2014.
U.S. Appl. No. 14/246,063, to Mark Evan Cerny, filed Apr. 5, 2014.
U.S. Appl. No. 14/246,064, to Tobias Berghoff, filed Apr. 5, 2014.
U.S. Appl. No. 14/246,067, to Tobias Berghoff, filed Apr. 5, 2014.
U.S. Appl. No. 14/246,068, to Mark Evan Cerny, filed Apr. 5, 2014.
U.S. Appl. No. 61/975,774, to Mark Evan Cerny, filed Apr. 5, 2014.
EPC Rule 94(3) Communication dated Sep. 12, 2018 for European Patent Application No. 15772605.0.
Final Office Action dated Sep. 4, 2018 for Japanese Patent application No. 2016-560642.
Non-Final Action for U.S. Appl. No. 15/652,134, dated Aug. 24, 2018.
Non-Final Office Action for U.S. Appl. No. 15/885,341, dated Nov. 16, 2018.
Notice of Allowance dated Jul. 17, 2018 for U.S. Appl. No. 15/717,041.
Notice of Allowance dated May 31, 2018 for U.S. Appl. No. 15/587,825.
Office Action dated Jul. 26, 2018 for Korean patent application No. 10-2016-7031094.
Final Office Action for U.S. Appl. No. 15/652,134, dated Feb. 15, 2019.
Non-Final Office Action for U.S. Appl. No. 16/119,274, dated Mar. 21, 2019.
Non-Final Office Action for U.S. Appl. No. 16/653,422, dated Apr. 16, 2019.
Final Office Action for U.S. Appl. No. 15/835,341, dated Mar. 15, 2019.
Notice of Allowance for U.S. Appl. No. 15/653,422, dated Jul. 31, 2019.
Notice of Allowance for U.S. Appl. No. 15/835,341, dated May 28, 2019.
Office Action dated Jul. 9, 2019 for Japanese Patent Application No. 2018-082884.

* cited by examiner 114 degree FOV 90 degree FOV

| 1 | 1 | 2 | 2 | 1 | 1 |
|---|---|---|---|---|---|
| 1 | 2 | 3 | 3 | 2 | 1 |
| 2 | 3 | 4 | 4 | 3 | 2 |
| 2 | 3 | 4 | 4 | 3 | 2 |
| 1 | 2 | 3 | 3 | 2 | 1 |
| 1 | 1 | 2 | 2 | 1 | 1 |

| 1 | 1 | 1 | 2 | 1 | 1 |
|---|---|---|---|---|---|
| 1 | 2 | 2 | 3 | 2 | 1 |
| 1 | 2 | 3 | 4 | 3 | 2 |
| 1 | 1 | 2 | 3 | 2 | 2 |
| 1 | 2 | 1 | 2 | 2 | 1 |
| 1 | 1 | 1 | 1 | 1 | 1 |

FIG. 4D

Initial projection 502

Screenspace after correction 506

VARYING EFFECTIVE RESOLUTION BY SCREEN LOCATION IN GRAPHICS PROCESSING BY APPROXIMATING PROJECTION OF VERTICES ONTO CURVED VIEWPORT

CLAIM OF PRIORITY

This application is a continuation of U.S. patent application Ser. No. 14/246,066 filed Apr. 5, 2014, then entire contents of which are incorporated herein by reference.

CROSS REFERENCE TO RELATED APPLICATIONS

This application is related to commonly-assigned, U.S. patent application Ser. No. 14/246,064 (published as U.S. Patent Application Publication Number 2015/0287231), to Tobias Berghoff, entitled "METHOD FOR EFFICIENT CONSTRUCTION OF HIGH RESOLUTION DISPLAY BUFFERS", filed Apr. 5, 2014, the entire contents of which are herein incorporated by reference.

This application is related to commonly-assigned, U.S. patent application Ser. No. 14/246,067 (now U.S. Pat. No. 9,710,957, to Tobias Berghoff, entitled "GRAPHICS PROCESSING ENHANCEMENT BY TRACKING OBJECT AND/OR PRIMITIVE IDENTIFIERS", filed Apr. 5, 2014, the entire contents of which are herein incorporated by reference.

This application is related to commonly-assigned, U.S. patent application Ser. No. 14/246,067 (now U.S. Pat. No. 9,495,790, to Mark Evan Cerny, entitled "GRADIENT ADJUSTMENT FOR TEXTURE MAPPING TO NON-ORTHONORMAL GRID", filed Apr. 5, 2014, the entire contents of which are herein incorporated by reference.

This application is related to commonly-assigned, U.S. patent application Ser. No. 14/246,061 (published as U.S. Patent Application Publication Number 2015/0287165), to Tobias Berghoff, entitled "VARYING EFFECTIVE RESOLUTION BY SCREEN LOCATION BY CHANGING ACTIVE COLOR SAMPLE COUNT WITHIN MULTIPLE RENDER TARGETS", filed Apr. 5, 2014, the entire contents of which are herein incorporated by reference.

This application is related to commonly-assigned, U.S. patent application Ser. No. 14/246,063 (now U.S. Pat. No. 9,710,881), to Mark Evan Cerny, entitled "VARYING EFFECTIVE RESOLUTION BY SCREEN LOCATION BY ALTERING RASTERIZATION PARAMETERS", filed Apr. 5, 2014, the entire contents of which are herein incorporated by reference.

This application is related to commonly-assigned, U.S. patent application Ser. No. 14/246,062 (now U.S. Pat. No. 9,652,882), to Mark Evan Cerny, entitled "GRADIENT ADJUSTMENT FOR TEXTURE MAPPING FOR MULTIPLE RENDER TARGETS WITH RESOLUTION THAT VARIES BY SCREEN LOCATION", filed Apr. 5, 2014, the entire contents of which are herein incorporated by reference.

FIELD OF THE DISCLOSURE

Aspects of the present disclosure are related to computer graphics. In particular, the present disclosure is related to varying resolution by screen location.

BACKGROUND

Graphics processing typically involves coordination of two processors, a central processing unit (CPU) and a graphics processing unit (GPU). The GPU is a specialized electronic circuit designed to accelerate the creation of images in a frame buffer intended for output to a display. GPUs are used in embedded systems, mobile phones, personal computers, tablet computers, portable game devices, workstations, and game consoles. A GPU is typically designed to be efficient at manipulating computer graphics. GPU's often have a highly parallel processing architecture that makes the GPU more effective than a general-purpose CPU for algorithms where processing of large blocks of data is done in parallel.

The CPU may send the GPU instructions, commonly referred to as draw commands, that instruct the GPU to implement a particular graphics processing task, e.g., render a particular texture that has changed with respect to a previous frame in an image. These draw commands may be coordinated by the CPU with a graphics application programming interface (API) in order to issue graphics rendering commands that correspond to the state of the particular application's virtual environment.

In order to render textures for a particular program, a GPU may perform a series of processing tasks in a "graphics pipeline" to translate the visuals in the virtual environment into images that can be rendered onto a display. A typical graphics pipeline may include performing certain rendering or shading operations on virtual objects in the virtual space, transformation and rasterization of the virtual objects in the scene to produce pixel data suitable for output display, and additional rendering tasks on the pixels (or fragments) before outputting the rendered image on a display.

Virtual objects of an image are often described in virtual space in terms of shapes known as primitives, which together make the shapes of the objects in the virtual scene. For example, objects in a three-dimensional virtual world to be rendered may be reduced to a series of distinct triangle primitives having vertices defined in terms of their coordinates in three-dimensional space, whereby these polygons make up the surfaces of the objects. Each polygon may have an associated index that can be used by the graphics processing system to distinguish a given polygon from other polygons. Likewise, each vertex may have an associated index that can be used to distinguish a given vertex from other vertices. A graphics pipeline may perform certain operations on these primitives to produce visuals for the virtual scene and transform this data into a two-dimensional format suitable for reproduction by the pixels of the display. The term graphics primitive information (or simply "primitive information"), as used herein, is used to refer to data representative of a graphics primitive. Such data includes, but is not limited to, vertex information (e.g., data representing vertex positions or vertex indices) and polygon information, e.g., polygon indices and other information that associates particular vertices with particular polygons.

As part of the graphics pipeline, the GPU may perform rendering tasks by implementing programs commonly known as shaders. A typical graphics pipeline may include vertex shaders, which may manipulate certain properties of the primitives on a per-vertex basis, as well as pixel shaders (also known as "fragment shaders"), which operate downstream from the vertex shaders in the graphics pipeline and may manipulate certain values on a per-pixel basis before transmitting the pixel data to a display. The fragment shaders may manipulate values relevant to applying textures to primitives. The pipeline may also include other shaders at various stages in the pipeline, such as geometry shaders that use the output of the vertex shaders to generate a new set of primitives, as well as compute shaders (CS) which may be implemented by a GPU to perform certain other general computational tasks.

Graphical display devices having a wide field of view (FOV) have been developed. Such devices include head mounted display (HMD) devices. In an HMD device, a small display device is worn on a user's head. The display device has a display optic in front of one eye (monocular HMD) or each eye (binocular HMD). An HMD device typically includes sensors that can sense the orientation of the device and change the scene shown by the display optics as the user's head moves. Conventionally, most stages of rendering scenes for wide FOV displays are performed by planar rendering where all parts of the screen have the same number of pixels per unit area.

To provide a realistic experience it is desirable for the graphics presented by a wide FOV display device to be of high quality and efficiently rendered.

It is within this context that the present disclosure arises.

BRIEF DESCRIPTION OF THE DRAWINGS

The teachings of the present disclosure can be readily understood by considering the following detailed description in conjunction with the accompanying drawings, in which:

FIG. 4C is a schematic diagram illustrating an example of varying pixel resolution by screen location in accordance with aspects of the present disclosure.

FIG. 4D is a schematic diagram illustrating an alternative example of varying pixel resolution screen location in accordance with aspects of the present disclosure.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Figure 1A:
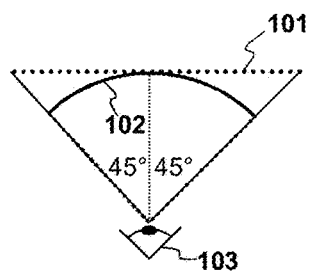
FIG. 1A and FIG. 1B are simplified diagrams illustrating certain parameters of wide field of view (FOV) displays.
Figure 1B:
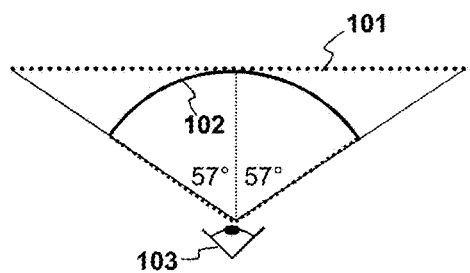
Figure 1C:
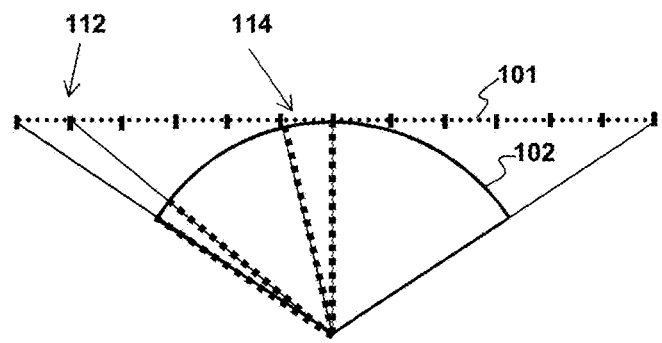
FIG. 1C illustrates different solid angles for different portions of a wide FOV display.

FIGS. 1A-1C illustrate a previously unappreciated problem with large FOV displays. FIG. 1A illustrates a 90 degree FOV display and FIG. 1B illustrates a 114 degree FOV display. In a conventional large FOV display, three dimensional geometry is rendered using a planar projection to the view plane 101. However, it turns out that rendering geometry onto a high FOV view plane is very inefficient. As may be seen in FIG. 1C, edge regions 112 and central regions 114 of view plane 101 are the same area but represent very different solid angles, as seen by a viewer 103. Consequently, pixels near the edge of the screen hold much less meaningful information than pixels near the center. When rendering the scene conventionally, these regions have the same number of pixels and the time spent rendering equal sized regions on the screen is the same.

Figure 2A:
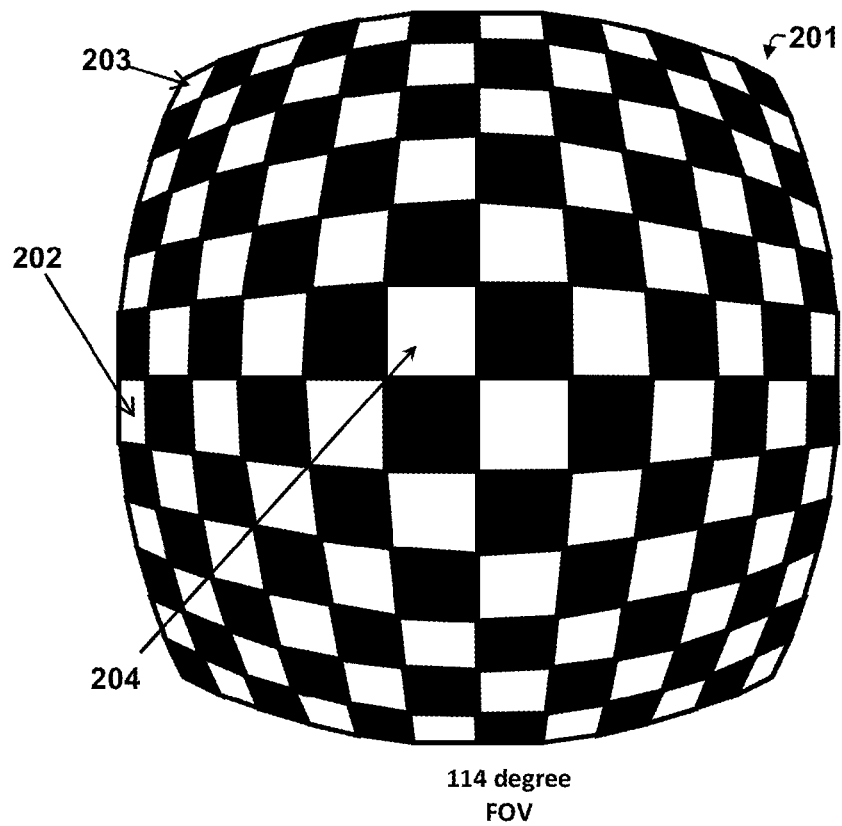
FIGS. 2A-2C illustrate examples of the relative importance of pixels in different regions of different wide FOV displays in accordance with aspects of the present disclosure.
Figure 2B:
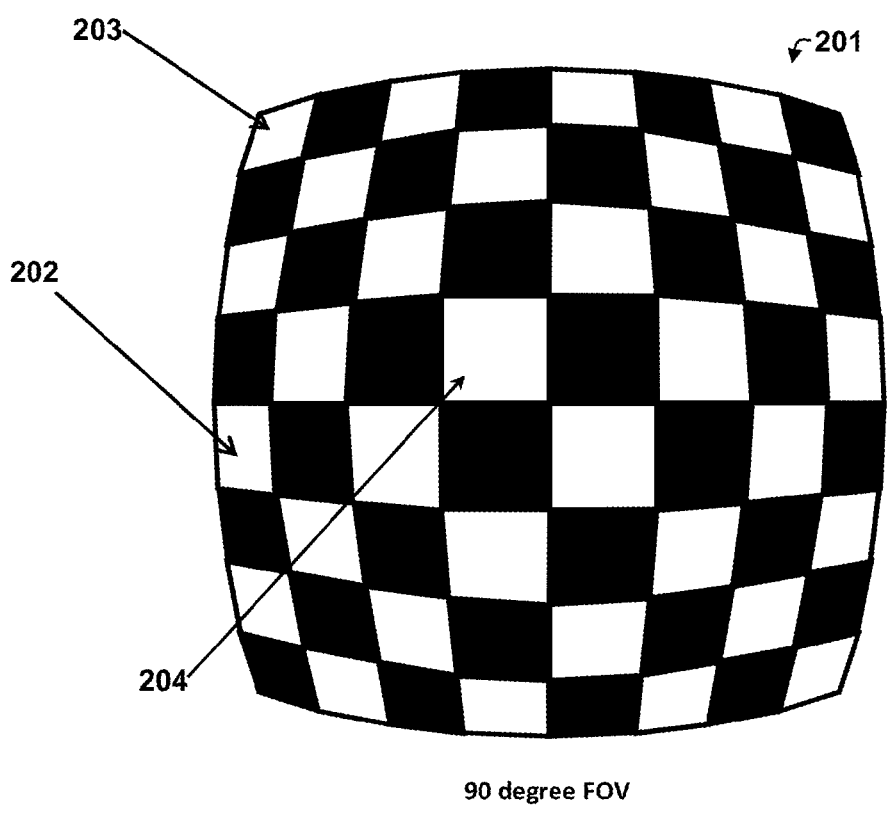
Figure 2C:
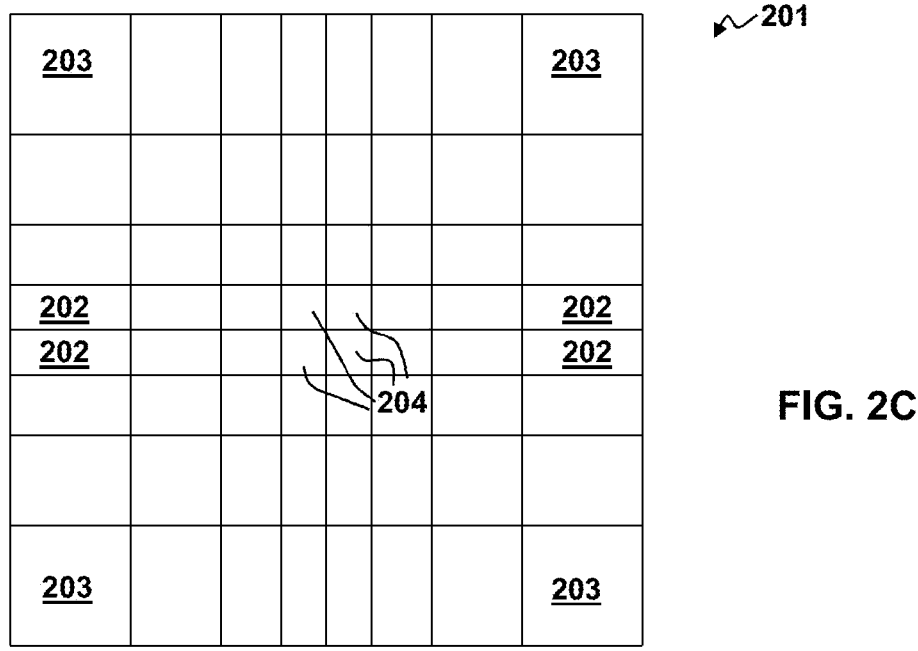

FIGS. 2A-2C illustrate the relative importance of different portions of a large FOV display in two dimensions for different sized fields of view. FIG. 2A expresses the variance in solid angle for each square of a planar checkerboard perpendicular to the direction of view, in the case that the checkerboard subtends an angle of 114 degrees. In other words, it expresses the inefficiency of conventional planar projective rendering to a 114 degree FOV display. FIG. 2B expresses the same information for a 90 degree FOV display. In such planar projective rendering, the projection compresses tiles 202 in the image 201 that are at the edges and tiles 203 at the corners into smaller solid angles compared to tiles 204 at the center. Because of this compression, and the fact that each tile in the image 201 has the same number of pixels in screen space, there is an inefficiency factor of roughly 4× for rendering the edge tiles 202 compared to the center tiles 204. By this it is meant that conventional rendering of the edge tiles 203 involves roughly 4 times as much processing per unit solid angle than for the center tiles 204. For the corner tiles 203, the inefficiency factor is roughly 8×. When averaged over the whole image 201, the inefficiency factor is roughly 2.5×.

The inefficiency is dependent on the size of the FOV. For example, for the 90 degree FOV display shown in FIG. 2B, the inefficiency factors are roughly 2× for rendering the edge tiles 202, roughly 3× for rendering the corner tiles 203, and roughly 1.7× overall for rendering the image 201.

Another way of looking at this situation is shown in FIG. 2C, in which the screen 102 has been divided into rectangles of approximately equal "importance" in terms of pixels per unit solid angle subtended. Each rectangle makes roughly the same contribution to the final image as seen through the display. One can see how the planar projection distorts the importance of edge rectangles 202 and corner rectangles 203. In fact, the corner rectangles 203 might make less of a contribution to the center rectangles due to the display optics, which may choose to make the visual density of pixels (as expressed as pixels per solid angle) higher towards the center of the display.

Figure 2D:
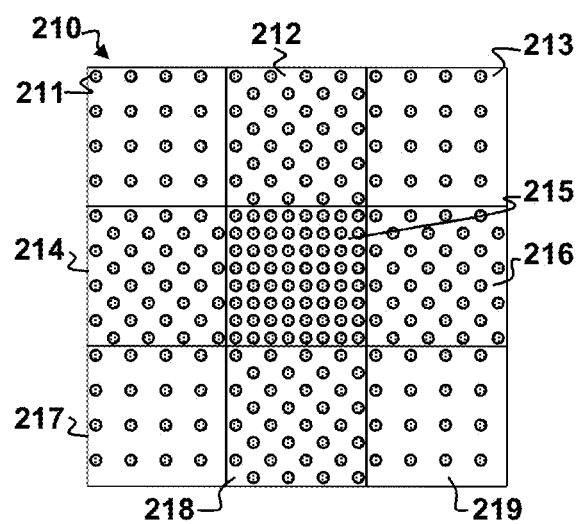
FIG. 2D illustrates an example of different pixel resolution for different regions of a screen of a FOV display in accordance with aspects of the present disclosure.

Based on the foregoing observations, it would be advantageous for an image 210 for a wide FOV display to have pixel densities that are smaller at edge regions 212, 214, 216, 218 than at center regions 215 and smaller at corner regions 211, 213, 217 and 219 than at the edge regions 212, 214, 216, 218 as shown in FIG. 2D. It would also be advantageous to render a conventional graphical image on the screen of a wide FOV display in a way that gets the same effect as varying the pixel densities across the screen without having to significantly modify the underlying graphical image data or data format or the processing of the data.

Alternatively, it would be advantageous if the screen space onto which vertices are projected and to which primitives are rendered approximated a portion of the surface of a sphere, such that pixels at the edges and corners of the screen space would cover approximately the same solid angle as the pixels at the center.

Figure 3:
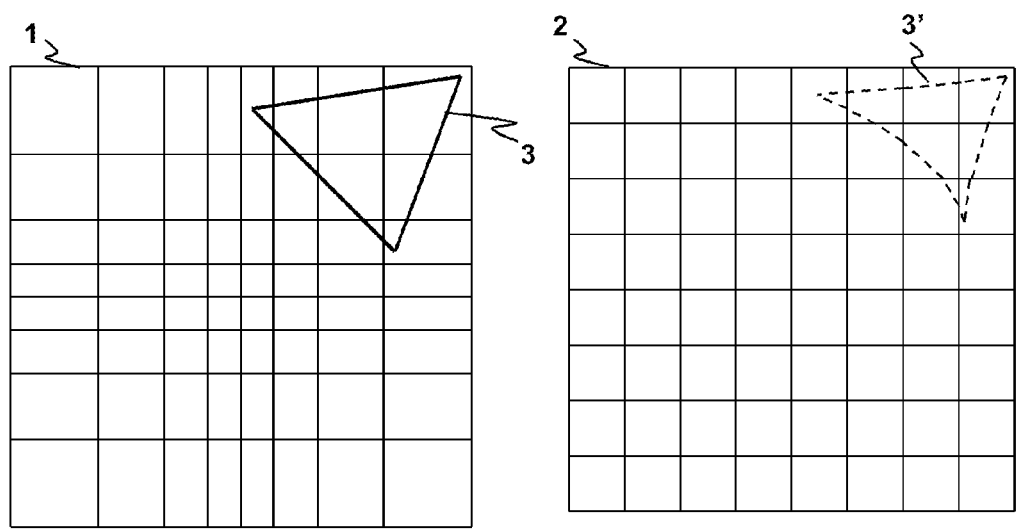
FIG. 3 is a schematic diagram illustrating transformation of screen subsections representing equal solid angle to corresponding subsections of equal area in accordance with aspects of the present disclosure.

According to aspects of the present disclosure, graphics processing utilizes a rasterization stage that approximates a projection of the vertices onto a curved viewport. In certain implementations, an equivalent to projection onto an approximated hemispherical screen space can be obtained in the graphics pipeline through conventional projection onto a flat screen space followed by transformation of screen space subsections representing equal solid angle to corresponding subsections of equal area. FIG. 3 illustrates an example such a transformation. On the left side of the drawing a planar screen space 1 is divided into rectangular regions of approximately equal solid angle. In alternative implementations, the screen space can be divided into non-rectangular regions. Concentric projection from a sphere to a view plane is known as a rectilinear projection (sometimes referred to as a gnomonic projection), and so an inverse rectilinear projection would exactly map pixels on a view plane back to elements of equal solid angle on a spherical viewport. As a true inverse rectilinear projection would not map vertical and horizontal lines to straight lines, certain implementations of aspects of the present disclosure instead employ a biaxial inverse rectilinear projection, in which each screen axis is transformed by arctangent formula to map each rectangle of approximately equal solid angle to a corresponding square region in a transformed screen space 2, as shown on the right hand side of the drawing. In this approximation, the square regions in the transformed screen space 2 are flat. By way of example, and not by way of limitation, the transformation maps a vertex of a triangle 3 at coordinates (H, V) to a corresponding vertex of transformed triangle 3' at coordinates (H', V') in constant pixel density space can be as follows:

For example, if $FOV_H$, $FOV_V$ are the horizontal and vertical field of view in radians and H', V' are normalized coordinates (i.e. in the range [−1 . . . 1] over the full FOV) in the de-projected constant pixel density space, H', V' can be obtained from H, V, the normalized coordinates (i.e. in the range [−1 . . . 1] over the full FOV) in the linear space, by solving the following equations to eliminate $\theta_H$, $\theta_V$ (which vary over the range [$-FOV_H/2$ . . . $FOV_H/2$] and [$-FOV_V/2$ . . . $FOV_V/2$] over the full FOV, respectively):

$H' = \theta_H * 2/FOV_H$ $V' = \theta_V * 2/FOV_V$ $H = \tan(\theta_H)/\tan(FOV_H/2)$ $V = \tan(\theta_V)/\tan(FOV_V/2)$ Solving for H' and V' yields:

$H' = \arctan(H * \tan(FOV_H/2)) * 2/FOV_H$ $V' = \arctan(V * \tan(FOV_V/2)) * 2/FOV_V$ It should be noted that while this solution produces nearly ideal solid area distribution among pixels, in an HMD rendering configuration, physical optics may not evenly distribute HMD display pixels over the visible field of view. Consequently, the most efficient solution in this configuration will account for distortion introduced by the optics in determining the ideal mapping of display pixels to screen area.

As conventional rasterization can only target a planar viewport, vertices within each region may only be remapped using a linear transformation. Therefore, in such cases certain implementations instead apply a continuous piecewise linear approximation of this transformation to vertices, as follows:

Choose a set of screen area boundaries H'[i] and V'[j] in increasing order in constant pixel density space, and calculate the corresponding boundaries H[i] and V[j] in linear screen space, using the inverse of the above transformations:

$H[i] = \tan(H'[i] * FOV_H/2)/\tan(FOV_H/2)$ $V[j] = \tan(V'[j] * FOV_V/2)/\tan(FOV_V/2)$ Then construct a piecewise linear transformation which preserves these boundaries:

H'=for i such that (H[i]<H<H[i+1]), $H'[i] + (H'[i+1] - H'[i]) * (H - H[i])/(H[i+1] - H[i])$ V'=for j such that (V[j]<V<V[j+1]), $V'[j] + (V'[j+1] - V'[j]) * (V - V[j])/(V[j+1] - V[j])$ Because the mapping from H,V to H',V' is slightly different for different subsections (indexed by i and j, above), the triangle 3 in the original screen space 1 maps to the transformed screen space 2 as a transformed triangle 3' having bent sides. However, when the resulting image is resolved to a linear or curved display, the transformation is inverted as part of the resolve, restoring the bent sides of triangle 3' back to apparently straight lines.

The advantages of such a screen space transformation are considerable. For example, for a 90 degree FOV if the area of the screen space 1 is 1.00 then this strategy results in a transformed screen space 2 with roughly an area of 0.62. By contrast, if the screen space 1 could be mapped to a spherical surface, the area of the transformed screen space 2 would be roughly 0.46. Even though the transformation is only approximately spherical, by reducing the area of the transformed screen space the graphics processing may be done far faster than without the transformation.

Aspects of the present disclosure utilize a screen space transformation of the type described with respect to FIG. 3 to reduce a GPU's computational load by effectively reducing the area of the screen space that is to be rendered.

According to aspects of the present disclosure a graphics processing system having a graphics processing unit and memory can perform graphics processing as follows. Data are received representing one or more vertices for a scene in a virtual space. A projection of the vertices onto a screen space of a display device is performed. The projection approximates a projection of the vertices onto a curved viewport. Primitive assembly is performed on the vertices to generate a one or more primitives in screen space from the projection of the vertices onto the screen space. Scan conversion is performed on the one or more primitives to determine which pixel or pixels of the plurality of pixels are part of corresponding primitives of the one or more primitives. A finished frame is then generated by performing pixel processing to assign pixel values to the pixel or pixels that are part of the corresponding primitives. In some implementations, the finished frame can be stored in the memory or displayed on the display device.

In certain implementations the projection of the vertices can be performed by initially projecting the vertices from virtual space onto a planar viewport of the scene. The planar viewport is subdivided into a plurality of subsections, each of which corresponds to an approximately equal solid angle of the screen space. Coarse rasterization is performed for each primitive converted to screen space coordinates to determine which subsection or subsections the primitive overlaps. For each primitive a screen space correction is performed for each subsection that the primitive overlaps to map the coordinates of each vertex of the primitive to a corresponding corrected vertex coordinates associated with the subsection, wherein the screen space correction is equivalent to mapping each subsection that the primitive overlaps to a corresponding planar corrected subsection of a plurality of planar corrected subsections of the curved viewport, wherein the corrected subsections of the curved viewport have equal area.

In such implementations, performing the screen space correction may include applying a linear transformation, with coefficients derived based on an arctangent formula, to screen space coordinates of one or more vertices of the primitive to generate corresponding corrected vertices.

In such implementations, the scan conversion may be performed per corrected subsection, wherein for a given primitive of the one or more primitives in a given subsection of the plurality of subsections, scan conversion is performed on that portion of the given primitive located in the given subsection using the corrected vertex coordinates for the given primitive that are associated with the given subsection.

In some implementations of aspects of the present disclosure the subsections of the plurality of subsections of the planar viewport may be rectangular.

In some implementations of aspects of the present disclosure the projection of the vertices, primitive assembly, and scan conversion are implemented in software by a compute shader.

In some alternative implementations of aspects of the present disclosure the projection of the vertices, primitive assembly, and scan conversion are implemented in hardware.

In some implementations of aspects of the present disclosure, the display device is characterized by a field of view of 90 degrees or more.

In some implementations of aspects of the present disclosure, the display device is a head-mounted display device.

Aspects of the present disclosure also include a graphics processing system having a graphics processing unit and memory configured to implement graphics processing in accordance with the above-mentioned aspects.

Aspects of the present disclosure also include a non-transitory computer-readable medium having computer executable instructions embodied therein that, when executed, implement graphics processing in accordance with the above-mentioned aspects.

System and Apparatus

Figure 4A:
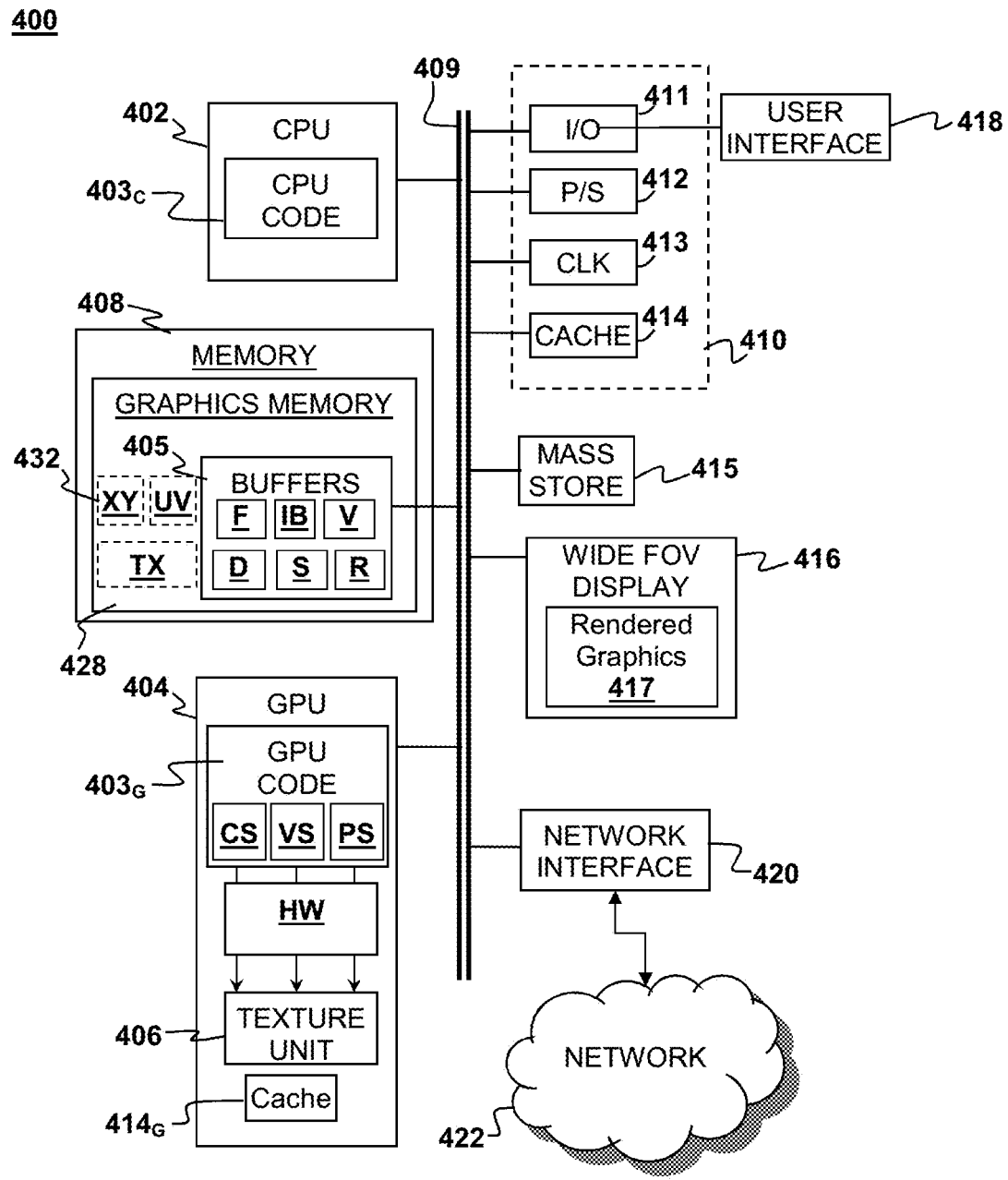
FIG. 4A is a block diagram of a graphics processing system in accordance with aspects of the present disclosure.

Aspects of the present disclosure include graphics processing systems that are configured to implement graphics processing in which effective pixel resolution varies by screen location by approximating projection of vertices onto a curved viewport. By way of example, and not by way of limitation, FIG. 4A illustrates a block diagram of a computer system 400 that may be used to implement graphics processing according to aspects of the present disclosure. According to aspects of the present disclosure, the system 400 may be an embedded system, mobile phone, personal computer, tablet computer, portable game device, workstation, game console, and the like.

The system 400 generally may include a central processor unit (CPU) 402, a graphics processor unit (GPU) 404, and a memory 408 that is accessible to both the CPU and GPU. The CPU 402 and GPU 404 may each include one or more processor cores, e.g., a single core, two cores, four cores, eight cores, or more. The memory 408 may be in the form of an integrated circuit that provides addressable memory, e.g., RAM, DRAM, and the like. The memory 408 may include graphics memory 428 that may store graphics resources and temporarily store graphics buffers 405 of data for a graphics rendering pipeline. The graphics buffers 405 may include, e.g., vertex buffers VB for storing vertex parameter values, index buffers IB for holding vertex indices, depth buffers (e.g., Z-buffers) DB for storing depth values of graphics content, stencil buffers SB, frame buffers FB for storing completed frames to be sent to a display, and other buffers. In the example shown in FIG. 4A, the graphics memory 428 is shown as part of the main memory. In alternative implementations, the graphics memory 428 could be a separate hardware component, possibly integrated into the GPU 404.

By way of example, and not by way of limitation, the CPU 402 and GPU 404 may access the memory 408 using a data bus 409. In some cases, it may be useful for the system 400 to include two or more different buses. The memory 408 may contain data that can be accessed by the CPU 402 and GPU 404. The GPU 404 may include a plurality of compute units configured to perform graphics processing tasks in parallel. Each compute unit may include its own dedicated local memory store, such as a local data share. Alternatively, the compute units may each access the memory 408 or a dedicated graphics memory 428.

The CPU may be configured to execute CPU code $403_C$, which may include an application that utilizes graphics, a compiler and a graphics API. The graphics API can be configured to issue draw commands to programs implemented by the GPU. The CPU code $403_C$ may also implement physics simulations and other functions. The GPU 404 may be configured to operate as discussed above. In particular, the GPU may execute GPU code $403_G$, which may implement shaders, such as compute shaders CS, vertex shaders VS, and pixel shaders PS, as discussed above. To facilitate passing of data between the compute shaders CS and the vertex shaders VS the system may include one or more buffers 405, which may include a frame buffer FB. The GPU code $403_G$ may also optionally implement other types of shaders (not shown), such as pixel shaders or geometry shaders. Each compute unit may include its own dedicated local memory store, such as a local data share. The GPU 404 may include one or more texture units 406 configured to perform certain operations for applying textures to primitives as part of a graphics pipeline.

According to certain aspects of the present disclosure, the CPU code $403_c$ and GPU code $403_g$ and other elements of the system 400 are configured to implement a graphics pipeline in which the GPU 404 receives vertex data 432 representing one or more vertices for one or more objects of a scene in a virtual space. The vertex data 432 can be generated from calculations, e.g., physics simulations implemented by execution of the CPU code $403_C$ by the CPU 402. The GPU 404 performs a projection of the vertices onto a screen space of the display device 416. The projection approximates a projection of the vertices onto a curved viewport. The GPU 404 then performs primitive assembly on the vertices to generate a one or more primitives in screen space from the projection of the vertices onto the screen space. Scan conversion is then performed on the one or more primitives to determine which pixel of screen space are part of corresponding primitives. The GPU 404 then generates a finished frame 460 by performing pixel processing to assign pixel values to the pixel or pixels that are part of the corresponding primitives. The finished frame can be stored in the memory 408 or graphics memory 428 (e.g., in the frame buffer FB) or displayed on the display device 416.

The projection of the vertices onto the screen space and other related portions of the graphics pipeline can be performed in software, e.g., by a front end implemented as a compute shader CS. Alternatively, the projection of the vertices onto the screen space and other related portions of the graphics pipeline can be implemented by specially designed hardware components HW that are configured to implement these functions.

Rectilinear de-projection as described above can enhance graphics processing by optimizing usage of computational and memory resources. In some implementations, the rectilinear de-projection is static for the optics and FOV of the display 416. In such cases, they can be configured so that the effective pixel resolution per screen subsection is as illustrated, e.g., in FIG. 4C. In the example shown in FIG. 4C, central subsections of the screen 416 are desired to have full resolution, and subsections further from the center have progressively lower resolution.

Aspects of the present disclosure also include implementations in which the de-projection is dynamic. For example, de-projection to improve rendering efficiency can be combined with eye tracking to improve foveal resolution. In such implementations, the system 400 includes hardware for tracking a user's gaze, i.e., where a user's eye is pointing, and relating this information to a corresponding screen location that the user is looking at. One example of such hardware could include a digital camera in a known location with respect to the screen of the display device 416 and pointed in the general direction of a user. The digital camera could be part of the user interface 418 or a separate component. The CPU code $403_C$ could include image analysis software that analyzes images from the camera to determine (a) if the user is in the image; (b) if the user is facing the camera; (c) if the user is facing the screen; (d) if the user's eyes are visible; (e) the orientation of the pupils of the user's eyes relative to the user's head; and (f) the orientation of the user's head relative to the camera. From the known position and orientation of the camera with respect to the screen, the orientation of the pupils of the user's eyes relative to the user's head and the orientation of the user's head relative to the camera the image analysis software could determine whether the user is looking at the screen and, if so, screen space coordinates for the portion of the screen the user is looking at. The CPU code $403_C$ could then pass these screen coordinates to the GPU code $403_G$, which could determine the subsection or subsections containing the foveal portion 480 (i.e., the portion the user is looking at). The GPU code $403_g$ could then modify the rectilinear de-projection accordingly so that the pixel resolution is highest in the subsection or subsections containing the foveal portion 480 and progressively lower in subsections further away from the foveal portion, as shown in FIG. 4D.

In some implementations, the CPU code $403_c$, GPU code $403_g$, and texture unit 406 may be further configured to implement modifications to texture mapping operations in conjunction with screen location dependent variable pixel resolution. For example, a pixel shader PS and texture unit 406 can be configured to generate one or more texture coordinates UV per pixel location XY to provide a coordinate set for one or more texture mapping operations, calculate gradient values Gr from the texture coordinates UV and use the gradient values to determine a level of detail (LOD) for a texture to apply to the primitive. These gradient values can be adjusted to account for the variable resolution as well as deviance from orthonormality in the sample locations.

By way of example, and not by way of limitation, specially designed hardware HW, the texture unit(s) 406, certain types of shaders, and other parts of the graphics pipeline described below may be implemented by special purpose hardware, such as an application-specific integrated circuit (ASIC), Field Programmable Gate Array (FPGA), or a system on chip (SoC or SOC).

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:

One or more processor cores (e.g., microcontroller, microprocessor or digital signal processor (DSP) cores.

Memory blocks, e.g., read only memory (ROM), random access memory (RAM), electrically erasable programmable read-only memory (EEPROM) and flash memory.

Timing sources, such as oscillators or phase-locked loops.

Peripherals, such as counter-timers, real-time timers, or power-on reset generators.

External interfaces, e.g., industry standards such as universal serial bus (USB), FireWire, Ethernet, universal asynchronous receiver/transmitter (USART), serial peripheral interface (SPI) bus.

Analog interfaces including analog to digital converters (ADCs) and digital to analog converters (DACs).

Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals and interfaces.

In some implementations, some or all of the functions of parts of the graphics pipeline may alternatively be implemented by appropriately configured software instructions executed by a software programmable general purpose computer processor, e.g., as compute shaders CS executed by the GPU 404. Such instructions may be embodied in a computer-readable medium, e.g., memory 408, graphics memory 428, or storage device 415.

The system 400 may also include well-known support functions 410, which may communicate with other components of the system, e.g., via the bus 409. Such support functions may include, but are not limited to, input/output (I/O) elements 411, power supplies (P/S) 412, a clock (CLK) 413 and cache 414. In addition to the cache 414, the GPU 404 may include its own GPU cache $314_G$, and the GPU may be configured so that programs running on the GPU 404 can read-through or write-though the GPU cache $414_G$.

The system 400 may include the display device 416 to present rendered graphics 417 to a user. In alternative implementations, the display device 416 is a separate component that works in conjunction with the system, 400. The display device 416 may be in the form of a flat panel display, head mounted display (HMD), cathode ray tube (CRT) screen, projector, or other device that can display visible text, numerals, graphical symbols or images. In particularly useful implementations, the display 416 is a large field of view (FOV) device having a screen with a field of view of 90 degrees or more (e.g., 114 degrees or more). The display device 416 displays rendered graphic images 417 (e.g., finished frames 460) processed in accordance with various techniques described herein.

The system 400 may optionally include a mass storage device 415 such as a disk drive, CD-ROM drive, flash memory, tape drive, or the like to store programs and/or data. The system 400 may also optionally include a user interface unit 418 to facilitate interaction between the system 400 and a user. The user interface 418 may include a keyboard, mouse, joystick, light pen, game controller, or other device that may be used in conjunction with a graphical user interface (GUI). The system 400 may also include a network interface 420 to enable the device to communicate with other devices over a network 422. The network 422 may be, e.g., a local area network (LAN), a wide area network such as the internet, a personal area network, such as a Bluetooth network or other type of network. These components may be implemented in hardware, software, or firmware, or some combination of two or more of these.

Graphics Pipeline

Figure 4B:
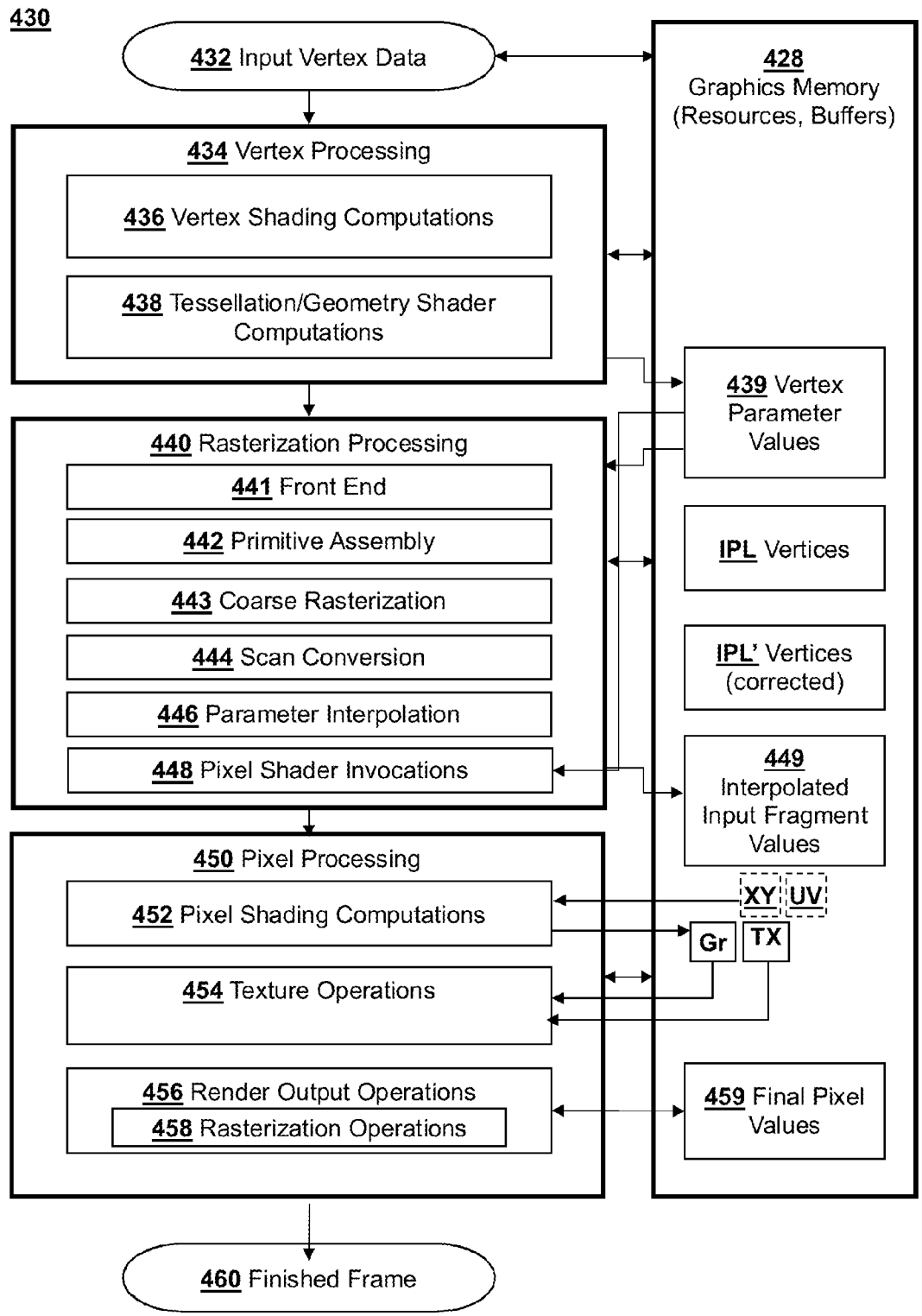
FIG. 4B is a block diagram of a graphics processing pipeline in accordance with aspects of the present disclosure.

According to aspects of the present disclosure, the system 400 is configured to implement portions of a graphics rendering pipeline. FIG. 4B illustrates an example of a graphics rendering pipeline 430 in accordance with aspects of the present disclosure.

The rendering pipeline 430 may be configured to render graphics as images that depict a scene having a two-dimensional or preferably three-dimensional geometry in virtual space (sometime referred to herein as "world space"). The early stages of the pipeline may include operations performed in virtual space before the scene is rasterized and converted to screen space as a set of discrete picture elements suitable for output on the display device 416. Throughout the pipeline, various resources contained in the graphics memory 428 may be utilized at the pipeline stages and inputs and outputs to the stages may be temporarily stored in buffers contained in the graphics memory before the final values of the images are determined.

The rendering pipeline may operate on input data 432, which may include one or more virtual objects defined by a set of vertices that are set up in virtual space and have geometry that is defined with respect to coordinates in the scene. The early stages of the pipeline may include what is broadly categorized as a vertex processing stage 434 in FIG. 4B, and this may include various computations to process the vertices of the objects in virtual space. This may include vertex shading computations 436, which may manipulate various parameter values of the vertices in the scene, such as position values (e.g., X-Y coordinate and Z-depth values), color values, lighting values, texture coordinates, and the like. Preferably, the vertex shading computations 436 are performed by one or more programmable vertex shaders VS of the GPU 404. The vertex processing stage may optionally include additional vertex processing computations, such as tessellation and geometry shader computations 438 which may be optionally used to generate new vertices and new geometries in virtual space. Tessellation computations subdivide scene geometries and geometry shading computations to generate new scene geometries beyond those initially set up in the application implemented by the CPU code $403_C$. Once the vertex processing stage 434 is complete, the scene is defined by a set of vertices each of which has a set of vertex parameter values 439. The vertex parameter values may include texture coordinates, tangents, lighting values, colors, positions, and the like.

The pipeline 430 may then proceed to rasterization processing stages 440 associated with converting the scene geometry into screen space and a set of discrete picture elements, i.e., pixels. The virtual space geometry (which can be three-dimensional) is transformed to screen space geometry (which is typically two-dimensional) through operations that may essentially compute the projection of the objects and vertices from virtual space to the viewing window (or "viewport") of the scene. Subsets of the vertices are grouped to define sets of primitives in screen space. According to aspects of the present disclosure, the rasterization stage 440 approximates a projection of the vertices onto a curved viewport.

In accordance the aspects of the present disclosure, the graphics pipeline 430 includes a front end 441 to the rasterization stage. The front end can be implemented as part of the rasterization stage or as an intermediate stage between vertex processing 434 and the rasterization stage 440. In the example depicted in FIG. 4B, the front end 441 is shown as part of the rasterization stage 440. However, aspects of the present disclosure are not limited to such implementations. In certain implementations, the front end 441 is implemented wholly or partially as a compute shader CS running on the GPU 404. However, aspects of the present disclosure are not limited to such implementations.

Operation of the front end 441 and related aspects of the present disclosure can be understood with reference to FIG. 4A and FIG. 4B.

The rasterization processing stage 440 depicted in FIG. 4B includes primitive assembly operations 442, which may set up the primitives defined by each set of vertices in the scene. Each vertex may be defined by an index, and each primitive may be defined with respect to these vertex indices, which may be stored in index buffers IB in the graphics memory 428. The primitives preferably include triangles defined by three vertices each, but may also include point primitives line primitives, and other polygonal shapes. During the primitive assembly stage 442, certain primitives may optionally be culled. For example, those primitives whose indices indicate a certain winding order may be considered to be back-facing and may be culled from the scene.

Figure 5:
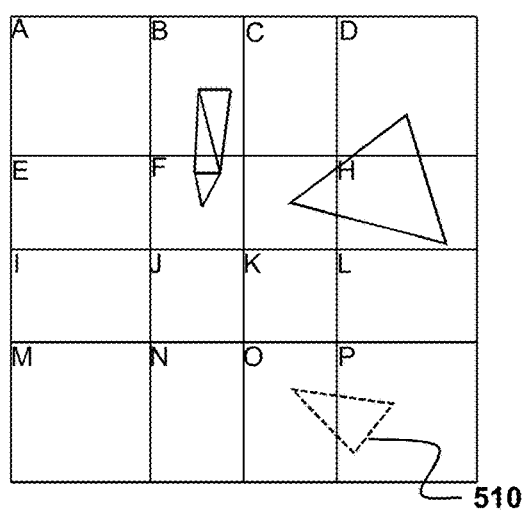
FIG. 5 is a schematic diagram illustrating examples of correction of vertices of graphics primitives in accordance with aspects of the present disclosure.
Figure 5:
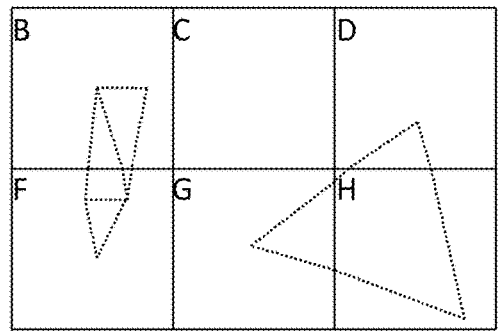

By way of example, and not by way of limitation, where the primitives are in the form of triangles defined by vertices in three dimensional virtual space, the primitive assembly determines where on the screen of the display 416 each triangle is located. Clipping and screen space transformation operations are typically performed by the primitive assembly unit 442. In the example depicted in FIG. 5, the front end 441 determines screen space coordinates for each vertex as indicated at 502. In particular implementations the screen space coordinates are computed, e.g., by computing initial projections of the locations of the vertices in virtual space onto a planar viewport of a scene. The planar viewport is subdivided into multiple subsections. Each subsection corresponds to an approximately equal solid angle of the screen space, e.g., as shown in FIG. 3. The front end 441 performs coarse rasterization for each primitive converted to screen space coordinates to determine which subsection or subsections the primitive overlaps, as part of this processing backfaced primitives 510 may be detected and removed. For each primitive converted to screen space, the front end 441 performs a screenspace correction 506 for each subsection that the primitive overlaps to map the coordinates of each vertex of the primitive to a corresponding corrected vertex coordinates. The screen space correction 506 is equivalent to mapping each subsection that the primitive overlaps to a corresponding planar corrected subsection of a plurality of planar corrected subsections of the curved viewport, where the corrected subsections of the curved viewport have equal area.

In certain implementations, correction of vertex coordinates at 502 involves a piecewise linear arctangent transformation of a vertex of at coordinates (H, V) to a corresponding corrected vertex coordinates (H', V') for each subsection as follows:

$H'$=for i such that $(H[i] < H < H[i+1])$, $H'[i]+(H'[i+1]-H'[i])*(H-H[i])/(H[i+1]-H[i])$ $V'$=for j such that $(V[j] < V < V[j+1])$, $V'[j]+(V'[j+1]-V'[j])*(V-V[j])/(V[j+1]-V[j])$ Wherein H[i] and V[j] are linear screen space boundaries derived as follows from corresponding constant pixel area space boundaries H'[i] and V'[j] chosen as a set in increasing order:

$H[i]=\tan(H'[i]*FOV_H/2)/\tan(FOV_H/2)$ $V[j]=\tan(V'[j]*FOV_V/2)/\tan(FOV_V/2)$ In certain implementations for HMD and similar displays with physical optics, the equation for these screen boundaries may be adjusted to account for deviation of the optics from the ideal mapping of equal solid angle to each display pixel.

In certain implementations, the corrected vertex coordinates are annotated with information that associates the vertex coordinates with the subsection. In these implementations, the primitive assembly stage 442 looks at the annotation of the corrected vertex coordinates and only sends the primitive to the appropriate GPU component that processes that subsection for scan conversion 444 operations. The scan conversion 444 only processes each primitive on a per-subsection basis, e.g., each primitive is processed only in the subsection indicated by the annotation.

The scan conversion operations 444 sample the primitives at each pixel and generate fragments (sometimes referred to as pixels) from the primitives for further processing when the samples are covered by the primitive. The scan conversion operations include operations that take a primitive that has been converted to screen space coordinates and determines which pixels are part of that primitive. In some implementations, multiple samples are taken within the primitives during the scan conversion operations 444, which may be used for anti-aliasing purposes. In certain implementations, different pixels may be sampled differently. For example, some edge pixels may contain a lower sampling density than center pixels to optimize certain aspects of the rendering for certain types of display device 416, such as head mounted displays (HMDs). The fragments (or "pixels") generated from the primitives during scan conversion 444 may have parameter values that may be interpolated to the locations of the pixels from the vertex parameter values 439 of the vertices of the primitive that created them. The rasterization stage 440 may include parameter interpolation operations 446 stage to compute these interpolated fragment parameter values 449, which may be used as inputs for further processing at the later stages of the pipeline.

According to aspects of the present disclosure, between primitive assembly 442 and scan conversion 444 certain operations take place that account for the fact that different subsections of the screen have different pixel resolutions. In particular implementations, once the screen location for the vertices of a primitive are known, a coarse rasterization 443 can be done to find all the predefined screen subsections (sometimes referred to herein as coarse rasterization tiles or supertiles) that the primitive overlaps. For each subsection that the primitive overlaps, the vertex locations for the primitive are adjusted to account for the pixel resolutions of the subsection. Scan conversion 444 and subsequent processing stages generate the final pixel values by performing pixel processing only on the specified number of active pixels for the relevant subsection or subsections.

In certain implementations, the GPU 404 is configured to implement coarse division of primitives between subsections in software, and the projection of the vertices, primitive assembly, and scan conversion in hardware. In some such implementations, the GPU 404 is configured to associate subsection indices to primitive vertices in software, with each subsection index selecting a screen space projection and viewport from a palette implemented in hardware. In other such implementations, the GPU 404 is configured to associate subsection indices to primitive vertex indices in software, with each subsection index selecting a screen space projection and viewport from a palette implemented in hardware.

The graphics pipeline 430 further include pixel processing operations, indicated generally at 450 in FIG. 4B, to further manipulate the interpolated parameter values 449 and perform further operations determining how the fragments contribute to the final pixel values for display 416. According to aspects of the present disclosure, these tasks can be performed in a conventional fashion. The pixel processing tasks include pixel shading computations 452 that further manipulate the interpolated parameter values 449 of the fragments. The pixel shading computations 452 may be performed by a programmable pixel shader or purpose built hardware in the GPU 404. Pixel shader invocations 448 may be initiated based on the sampling of the primitives during the rasterization processing stages 440. The pixel shading computations 452 may output values to one or more buffers 405 in graphics memory 428, sometimes referred to as render targets RT, or if multiple, as multiple render targets (MRTs). MRTs allow pixel shaders to optionally output to more than one render target, each with the same screen dimensions but potentially with a different pixel format.

The pixel processing operations 450 typically include texture mapping operations 454, which may be performed to some extent by one or more shaders (e.g., pixel shaders PS compute shaders CS, vertex shaders VS or other types of shaders) and to some extent by the texture units 406. The pixel shader computations 452 include calculating texture coordinates UV from screen space coordinates XY, and sending the texture coordinates to the Texture Operations 454, and receiving texture data TX. The texture coordinates UV could be calculated from the screen space coordinates XY in an arbitrary fashion, but typically are calculated from interpolated input values or sometimes from the results of previous texture operations. Gradients Gr are often directly calculated from quads of texture coordinates by the texture units 406 (Texture Operations hardware units), but can optionally be calculated explicitly by the pixel shader computations 452 and passed to the texture operations 454 rather than relying on the texture units 406 to perform the default calculation.

The texture operations 456 generally include the following stages, which can be performed by some combination of a pixel shader PS and a texture unit 406. First, one or more texture coordinates UV per pixel location XY are generated and used to provide a coordinate set for each texture mapping operation. Gradient values Gr are calculated from the texture coordinates UV and used to determine a level of detail (LOD) for a texture to apply to the primitive.

The pixel processing 450 generally culminates in render output operations 456, which may include what are commonly known as raster operations (ROP). Rasterization Operations (ROP) is simply run multiple times per pixel, once for each render target among the multiple render targets (MRTs). During the output operations 456, the final pixel values 459 may be determined in a frame buffer, which may optionally include merging fragments, applying stencils, depth tests, and certain per sample processing tasks. The final pixel values 459 include the collected output to all active render targets (MRTs). The GPU 404 uses the final pixel values 459 to make up a finished frame 460, which may optionally be displayed on the pixels of the display device 416 in real-time.

Additional Aspects

Additional aspects of the present disclosure include a graphics processing method, comprising: receiving data representing one or more vertices for a scene in a virtual space;

performing a projection of the vertices onto a screen space of a display device having a plurality of pixels, wherein the projection approximates a projection of the vertices onto a curved viewport;

performing primitive assembly on the vertices to generate a one or more primitives in screen space from the projection of the vertices onto the screen space;

performing scan conversion on the one or more primitives to determine which pixel or pixels of the plurality of pixels are part of corresponding primitives of the one or more primitives;

generating a finished frame by performing pixel processing to assign pixel values to the pixel or pixels that are part of the corresponding primitives.

In some implementations of the foregoing method the finished frame is stored in a memory or displayed on the display device.

Another additional aspect is a computer-readable medium having computer executable instructions embodied therein that, when executed, implement the foregoing method.

Yet another additional aspect is as computer program product downloadable from a communication network and/or stored on a computer-readable and/or microprocessor-executable medium, characterized in that it comprises program code instructions for implementing the foregoing method.

A further aspect is an electromagnetic or other signal carrying computer-readable instructions for performing the foregoing method.

Another aspect of the present invention is a graphics processing method in which vertices and/or pixel data are processed to generate final pixel values for a viewport of a scene that is displayed on a display device in such a way that parts of the scene in two different subsections have different effective pixel resolution.

In some implementations the method further includes determining a portion of a screen of the display device that a user is looking at and varying the pixel resolution such that the effective pixel resolution is highest in the subsection or subsections containing the portion the user is looking at.

An additional aspect is a computer graphics apparatus configured to implement the aforementioned methods.

Another additional aspect is a computer-readable medium having computer executable instructions embodied therein that, when executed, implement the foregoing method.

Yet another additional aspect is as computer program product downloadable from a communication network and/or stored on a computer-readable and/or microprocessor-executable medium, characterized in that it comprises program code instructions for implementing the foregoing method.

A further additional aspect is an electromagnetic or other signal carrying computer-readable instructions for performing the foregoing method.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for graphics processing with a graphics processing system having a graphics processing unit and memory, comprising:

performing a mathematical projection of one or more vertices for a scene in a virtual space onto a screen space before rendering the scene on a display device having a plurality of pixels, wherein the mathematical projection approximates projection of the vertices onto a curved viewport by mathematically projecting the vertices onto a flat screen space followed by transformation of subsections of the flat screen space representing approximately equal solid angle to corresponding subsections of approximately equal area thereby reducing an effective area of the screen space that is to be rendered, wherein the transformation of subsections occurs before rendering, wherein performing the mathematical projection before performing primitive assembly on the vertices to generate one or more primitives reduces a computational load associated with rendering; and storing the finished frame in the memory or displaying the finished frame on the display device.

2. The method of claim 1, performing the projection of the vertices includes:

computing initial projections of the vertices from virtual space onto a planar viewport of the scene, the planar viewport being subdivided into a plurality of subsections, wherein each subsection of the plurality corresponds to an approximately equal solid angle of the screen space;

performing coarse rasterization for each primitive converted to screen space coordinates to determine which subsection or subsections the primitive overlaps; and for each primitive of the one or more primitives performing a screenspace correction for each subsection that the primitive overlaps to map the coordinates of each vertex of the primitive to a corresponding corrected vertex coordinates associated with the subsection, wherein the screen space correction is equivalent to mapping each subsection that the primitive overlaps to a corresponding planar corrected subsection of a plurality of planar corrected subsections of the curved viewport, wherein the corrected subsections of the curved viewport have equal area.

3. The method of claim 2, wherein performing the screen space correction includes performing a computation involving applying a piecewise linear approximation of an arctangent formula to screen space coordinates of one or more vertices of the primitive to generate corresponding corrected vertices.

4. The method of claim 2, wherein performing the screen space correction includes performing a computation involving applying a piecewise linear approximation of the image distortion produced by physical optics in the display device to screen space coordinates of one or more vertices of the primitive to generate corresponding corrected vertices.

5. The method of claim 2, wherein the scan conversion is performed per corrected subsection, wherein for a given primitive of the one or more primitives in a given subsection of the plurality of subsections scan conversion is performed on that portion of the given primitive located in the given subsection using the corrected vertex coordinates for the given primitive that are associated with the given subsection.

6. The method of claim 2, wherein the subsections of the plurality of subsections of the planar viewport are rectangular.

7. The method of claim 1, wherein the projection of the vertices, primitive assembly, and scan conversion are implemented in software by a compute shader.

8. The method of claim 1, wherein the projection of the vertices, primitive assembly, and scan conversion are implemented in hardware.

9. The method of claim 1, further comprising determining a portion of a screen of the display device that a user is looking at and wherein the projection is configured to vary an effective pixel resolution such that the effective pixel resolution is highest for one or more subsections of the screen containing the portion the user is looking at.

10. The method of claim 1, wherein the projection is static for given optics and field of view of the display device.

11. The method of claim 1, wherein the projection is static for given optics and field of view of the display device and wherein the projection is configured such that, one or more central subsections of the screen have a full effective pixel resolution, and subsections further from the center have progressively lower effective pixel resolution.

12. The method of claim 1, wherein the display device is characterized by a field of view of 90 degrees or more.

13. The method of claim 1, wherein the display device is a head-mounted display device.

14. A non-transitory computer-readable medium having computer executable instructions embodied therein that, when executed, implement the method of claim 1.

15. A system for graphics processing, comprising:
a graphics processing unit (GPU); and
a memory,
wherein the GPU is configured to perform a mathematical projection of one or more vertices for a scene in a virtual space onto a screen space before rendering the scene on a display device having a plurality of pixels, wherein the mathematical projection approximates a projection of the vertices onto a curved viewport by projecting the vertices onto a flat screen space followed by transformation of subsections of the flat screen space representing approximately equal solid angle to corresponding subsections of approximately equal area thereby reducing an effective area of the screen space that is to be rendered, wherein the transformation of subsections occurs before rendering, wherein performing the mathematical projection before performing primitive assembly on the vertices and scan conversion reduces a computational load associated with rendering; and
wherein the GPU is configured to store the finished frame in the memory or display the finished frame on the display device.

16. The system of claim 15, wherein the GPU is configured to perform the projection of the vertices by:

computing initial projections of the vertices from virtual space onto a planar viewport of the scene, the planar viewport being subdivided into a plurality of subsections, wherein each subsection of the plurality corresponds to an approximately equal solid angle of the screen space;

performing coarse rasterization for each primitive converted to screen space coordinates to determine which subsection or subsections the primitive overlaps; and for each primitive of the one or more primitives performing a screenspace correction for each subsection that the primitive overlaps to map the coordinates of each vertex of the primitive to a corresponding corrected vertex coordinates associated with the subsection, wherein the screen space correction is equivalent to mapping each subsection that the primitive overlaps to a corresponding planar corrected subsection of a plurality of planar corrected subsections of the curved viewport.

17. The system of claim 16, wherein the GPU is configured to perform the screen space correction by performing a computation involving applying a piecewise linear approximation of an arctangent formula to screen space coordinates of one or more vertices of the primitive to generate corresponding corrected vertices.

18. The system of claim 16, wherein the GPU is configured to perform the screen space correction by performing a computation involving applying a piecewise linear approximation of image distortion produced by physical optics in the display device to screen space coordinates of one or more vertices of the primitive to generate corresponding corrected vertices.

19. The system of claim 16, wherein the GPU is configured to perform the scan conversion per corrected subsection, wherein for a given primitive of the one or more primitives in a given subsection of the plurality of subsections the GPU performs the scan conversion on that portion of the given primitive located in the given subsection using the corrected vertex coordinates for the given primitive that are associated with the given subsection.

20. The system of claim 16, wherein the subsections of the plurality of subsections of the planar viewport are rectangular.

21. The system of claim 16, wherein the corrected subsections of the curved viewport have equal area.

22. The system of claim 21, wherein the subsections of the plurality of subsections of the planar viewport are rectangular.

23. The system of claim 15, wherein the GPU is configured to implement projection of the vertices, primitive assembly, and scan conversion in software with a compute shader.

24. The system of claim 15, wherein the GPU is configured to implement the projection of the vertices, primitive assembly, and scan conversion in hardware.

25. The system of claim 15, wherein the GPU is configured to implement coarse division of primitives between subsections in software, and the projection of the vertices, primitive assembly, and scan conversion in hardware.

26. The system of claim 25, wherein the GPU is configured to associate subsection indices to primitive vertices in software, with each subsection index selecting a screen space projection and viewport from a palette implemented in hardware.

27. The system of claim 25, wherein the GPU is configured to associate subsection indices to primitive vertex indices in software, with each subsection index selecting a screen space projection and viewport from a palette implemented in hardware.

28. The system of claim 15, further comprising the display device.

29. The system of claim 15, wherein the display device is characterized by a field of view of 90 degrees or more.

30. The system of claim 15, wherein the display device is a head-mounted display device.

31. The system of claim 15, wherein the system is configured to determine a portion of a screen of the display device that a user is looking at and wherein the projection is configured to vary an effective pixel resolution such that the effective pixel resolution is highest for one or more subsections of the screen containing the portion the user is looking at.

32. The system of claim 15, wherein the projection is static for given optics and field of view of the display device.

33. The system of claim 15, wherein the projection is static for given optics and field of view of the display device and wherein the projection is configured such that, one or more central subsections of the screen have a full effective pixel resolution, and subsections further from the center have progressively lower effective pixel resolution.

* * * * *